United States Patent [19]
van Dalsem et al.

[11] Patent Number: 5,759,612
[45] Date of Patent: Jun. 2, 1998

[54] SOLID FOOD COMPOSITION WHICH PROVIDES A TIME RELEASED ENERGY SOURCE

[75] Inventors: Simon van Dalsem, Wipmolen, Netherlands; Gerry G. Jewell, Crowthorne, United Kingdom

[73] Assignee: The Quaker Oats Company, Chicago, Ill.

[21] Appl. No.: 684,512

[22] Filed: Jul. 19, 1996

Related U.S. Application Data

[63] Continuation of Ser. No. 269,989, Jul. 1, 1994, abandoned.

[51] Int. Cl.$^6$ .......................................................... A23L 1/18
[52] U.S. Cl. ........................ 426/618; 426/549; 426/559; 426/560; 426/619; 426/620; 426/621
[58] Field of Search .................................. 426/618, 619, 426/620, 621, 549, 560, 559

[56] References Cited

U.S. PATENT DOCUMENTS

| | | | |
|---|---|---|---|
| 4,038,427 | 7/1977 | Martin | 426/285 |
| 4,061,790 | 12/1977 | Cole | 426/303 |
| 4,871,557 | 10/1989 | Linscott | 426/618 |
| 5,024,996 | 6/1991 | Ringe | 514/54 |
| 5,100,683 | 3/1992 | Singer et al. | 426/302 |
| 5,151,283 | 9/1992 | Foehse et al. | 426/619 |
| 5,223,298 | 6/1993 | Wullschleger et al. | 426/618 |
| 5,246,723 | 9/1993 | Kameyama et al. | 426/549 |
| 5,275,830 | 1/1994 | Smith | 426/620 |
| 5,372,826 | 12/1994 | Holtz et al. | 426/619 |

FOREIGN PATENT DOCUMENTS

| | | | |
|---|---|---|---|
| 0504055 | 9/1992 | European Pat. Off. | A23L 1/09 |
| 2431862 | 2/1980 | France | A61K 31/70 |
| 4007911 | 2/1991 | Germany | A23L 1/29 |
| 2000426 | 1/1979 | United Kingdom | A23L 1/164 |
| 2186176 | 8/1987 | United Kingdom | |
| 9400026 | 1/1994 | WIPO | A23L 1/164 |

OTHER PUBLICATIONS

"Twin Screw Extrusion of Corn Flakes", T. Midden; Cereal Foods World, vol. 34, No. 11, pp. 941–943 (1989).

*Breakfast Cereals and How They Are Made;* R. Fast and E. Caldwell, Editors, First Edition, Published by The American Association of Cereal Chemists (1990), Chapter Three, "Blending and Cooking", pp. 53–56.

*Breakfast Cereals and How They Are Made;* R. Fast and E. Caldwell, Editors, First Edition, Published by The American Associate of Cereal Chemists (1990), Chapter Nine, "Rolled Oats and Related Products", pp. 245–259.

*Primary Examiner*—Lien Tran
*Attorney, Agent, or Firm*—Lars S. Johnson

[57] ABSTRACT

A solid food composition, preferably a ready-to-eat cereal composition, which provides for the release of energy over an extended period of time. The solid food composition includes: (a) from about 20% to about 55% by weight of a low fiber, high degree of cook, fraction; (b) from about 20% to about 40% by weight of a medium fiber, medium degree of cook, fraction; and (c) from about 20% to about 45% by weight of a high fiber, low degree of cook, fraction; wherein the solid food composition includes at least about 20% by weight of an oat source selected from the group consisting of rolled oats or oat flour, and wherein the oat source is provided by one or more of the fractions.

10 Claims, No Drawings

SOLID FOOD COMPOSITION WHICH PROVIDES A TIME RELEASED ENERGY SOURCE

This application is a continuation of application Ser. No. 08/269,989 filed on Jul. 1, 1994 now abandoned.

FIELD OF INVENTION

The present invention relates to a solid food composition which is digested and provides energy over an extended period of time. The present invention further relates to a preferred ready-to-eat cereal product which is digested and provides energy over an extended period of time.

BACKGROUND OF INVENTION

Ready-to-eat cereals offer many benefits and advantages to the consumer. For example, ready-to-eat cereals are typically nutritious and balanced food sources. Ready-to-eat cereals also are typically high in grains and complex-carbohydrates, which are generally recognized as being healthful. Ready-to-eat cereals often are also low in undesirable fat, which is generally recognized as something that should not be consumed to excess. The more nutritious ready-to-eat cereals are also low in sugar and sodium, which also are preferably consumed in moderation. These types of ready-to-eat cereals are especially desirable to the health conscious consumer. Another advantage to ready-to-eat cereals is their convenience. Ready-to-eat cereals typically only require the addition of milk for preparation, although they can also be eaten dry. For time pressed consumers this convenience offers an important and significant advantage.

As desirable as ready-to-eat cereals are, they can be improved upon. For example, given their generally nutritious nature as a food source, it would be preferable if more of the average person's daily diet comprised such ready-to-eat cereals. If this were not possible however, it would also be desirable for more of the average person's daily energy daily intake to be provided by ready-to-eat cereals. This would allow for less consumption of less desirable and less nutritious food sources.

Some ready-to-eat cereals also have the disadvantage in that one tends to get hungry in a matter of hours after consuming them. This is because ready-to-eat cereals are typically digested at a fairly fast rate, due to their general make-up of cooked grain sources which have already been gelatinized.

These advantages and disadvantages associated with ready-to-eat cereals are also applicable to other solid foods. It would thus be desirable to provide for a solid food composition, and particularly a ready-to-eat cereal, which contains a carbohydrate mixture that is not entirely digested at such a high rate, but is digested over an extended period of time. This in turn will allow the consumer to last a longer period of time without feeling hungry. There are also other benefits associated with such a product. For example, the health conscious consumer or the dieting consumer would then be able to avoid between meal snacks between the breakfast and the lunch meals.

None of the food materials known heretofore in the art provides for such a solid food composition, or a ready-to-eat cereal, which is digested over an extended period of time, and which correspondingly provides a sustained energy release over time. This extended digestion and energy release in turn allows the consumer to go between meals without feeling unduly hungry.

BACKGROUND ART

The art teaches ready-to-eat cereals and methods for preparing them. For example, U.S. Pat. No. 5,024,996, issued Jun. 18, 1991, to Ringe, relates to ready-to-eat cereals containing high levels of both soluble and insoluble fiber. The claimed ready-to-eat cereal comprises a cereal composition including from about 20% to 80% by weight of the cereal composition of a starchy cereal ingredient, from about 10% to 70% by weight of the cereal composition of a barley flour extract, sufficient amounts of an insoluble source so as to provide a cereal composition with a weight ratio of soluble fiber to insoluble fiber of about 1 to 5:1, a moisture content of about 1% to 6%, and a minimum soluble fiber content of about 10% by weight of the cereal composition. Ringe also teaches how to prepare this ready-to-eat cereal. Ringe teaches nothing concerning preparing a ready-to-eat cereal which provides for an energy release over an extended period of time.

U.S. Pat. No. 4,038,427, issued Jul. 26, 1977, to Martin, teaches a process for preparing a dried agglomerated cereal mixture. The process taught by Martin comprises mixing at least 25% by weight of amylaceous and proteinaceous bumped whole cereal grains, grain by-products of varying particle size and density, and a quantity of flaked puffed gelatinized cereal grains having dextrinous surfaces and a lower particle density than the balance of said cereal mixture combined and adapted to receive on the surfaces thereof finer cereal mixture particles upon being wetted. In the Martin process, a liquid fat is caused to be coated and evenly distributed over the cereal mixture together with a saccharidal syrup having a D.E. of at least 5. This coated cereal mixture is continuously tumbled until the particles aggregate to form a heterogeneous cluster of particles adhering around the discrete and separate puffed flakes. The aggregates are then dried to produce an agglomerated cereal mixture. Martin also fails to teach anything concerning a ready-to-eat cereal product which provides for the release of energy over an extended period of time.

U.S. Pat. No. 5,246,723, issued Sep. 21, 1993, to Kameyama et al., teaches a material which can be used to make a food and which is relatively slowly absorbed by the digestive system. The food taught by Kameyama et al. comprises a farinaceous substance and a fatty acid compound which is bound to the farinaceous substance. The fatty acid compound has an occupation ratio to the amylose in the farinaceous substance of not less than 10%. According to Kameyama et al., this is advantageous because it decreases caloric intake, which is beneficial to dieting consumers. The particular cereal composition taught by Kameyama et al. also is alleged to produce taste and palatability equivalent to those of ordinary starch. Kameyama et al. also fail to teach a ready-to-eat cereal which provides for a carbohydrate mixture which is digested over an extended period of time, which in turn provides for the release of energy over an extended period of time.

It is therefore an object of the present invention to provide a solid food composition, including a preferred ready-to-eat cereal composition, which is convenient for use by consumers, which is digested over an extended period of time, which provides for the release of energy over an extended period of time, and which has a pleasing taste to consumers. These objects are accomplished by the solid food composition, and preferred ready-to-eat cereal composition, claimed in the present invention.

SUMMARY OF THE INVENTION

The present invention relates to a solid food composition which is digested over an extended period of time and which provides for the release of energy over an extended period of time. The solid food composition comprises: (a) from about 20% to about 55% by weight of a low fiber, high degree of cook, fraction; (b) from about 20% to about 40% by weight of a medium fiber, medium degree of cook, fraction; and (c) from about 20% to about 45% by weight of a high fiber, low degree of cook, fraction; wherein said solid food composition comprises at least about 20% by weight of an oat source selected from the group consisting of rolled oats or oat flour, and wherein said oat source is provided by one or more of said fractions.

DETAILED DESCRIPTION OF THE INVENTION

The present invention relates to a solid food composition, preferably in the form of a ready-to-eat cereal composition, which is digested over an extended period of time and which provides for the release of energy over the same extended period of time, typically from about 0.5 to about 6, more typically from about 0.5 to about 5, still more typically from about 0.5 to about 4 hours. The description of the solid food composition provided herein, including all compositional parameters, is applicable to and describes the preferred ready-to-eat cereal composition embodiment of the solid food composition as well. The solid food composition may also embody forms other than a ready-to-eat cereal. Examples of such other embodiments include, but are not limited to, shaped, cohesive forms such as food bars, and cookies. When in such other forms, the solid food composition will comprise the same compositional parameters as described herein. The solid food composition may additionally contain components peculiar to its particular embodiment. For example, a food bar or cookie may further comprise a binding agent capable of allowing the bar or cookie to maintain its shape. The types and amount of such additional components will depend upon the particular embodiment of the solid food composition, and will be appreciated by and known to those skilled in the art.

The solid food composition of the present invention comprises three separate fractions. The first fraction is a low fiber, high degree of cook, fraction. The second fraction is a medium fiber, medium degree of cook, fraction. The third fraction is a high fiber, low degree of cook, fraction. The solid food composition of the present invention is further characterized in that it comprises at least about 20% by weight of an oat source selected from the group consisting of rolled oats, oat flour, and mixtures thereof. Such oat source is provided by one or more of the above-described fractions.

The solid food composition comprises from about 20% to about 55%, preferably from about to 20% to about 50%, more preferably from about 25% to about 45% by weight of the low fiber, high degree of cook, fraction; from about 20% to about 40%, preferably from about 20% to about 35%, more preferably from about 20% to about 30% by weight of the medium fiber, medium degree of cook, fraction; and from about 20% to about 45%, preferably from about 20% to about 40%, more preferably from about 20% to about 35% by weight of the high fiber, low degree of cook, fraction.

The solid food composition of the present invention also preferably comprises from about 20% to about 40%, more preferably from about 20% to about 35%, still more preferably from about 20% to about 30% by weight of the oat source. When the oat source is rolled oats, the solid food composition of the present invention comprises from about 10% to about 30%, preferably from about 10% to about 25%, more preferably from about 10% to about 20% by weight rolled oats. When the oat source is oat flour, the solid food composition of the present invention comprises from about 10% to about 30%, preferably from about 10% to about 25%, more preferably from about 10% to about 20% by weight oat flour. The oat source is included in the composition of the present invention because oats are rich in soluble and insoluble fiber and have a high degree of uncooked starch in the form of rolled oats. Oats are also a low glycemic index food.

The oat source is provided by the three fractions comprising the solid food composition. Preferably the oat source is provided by the high fiber, low degree of cook, fraction in the form of rolled oats. Rolled oats can be partially replaced by oat flour, which is derived from rolled oats.

The low fiber, high degree of cook, fraction is characterized in that it is digested relatively rapidly, as compared to the other two fractions, and therefore provides for a relatively fast energy release. The low fiber, high degree of cook, fraction is typically digested, and releases its energy, over a period of time of from about 0.5 to about 2.5, more typically from about 0.5 to about 2, still more typically from about 0.5 to about 1.5 hours.

The low fiber, high degree of cook, fraction comprises a grain source. Any grain source known to those skilled in the art which is in a condition such that it can be digested rapidly to provide a quick energy release may be used in the composition of the present invention. Examples of useful grain sources which can comprise the low fiber, high degree of cook, fraction of the present invention include, but are not limited to, corn flakes, crisp rice, puffed rice, flaked rice, and mixtures thereof, with corn flakes, crisp rice, and mixtures thereof being preferred. For the preferred corn flakes and crisp rice, the solid food composition of the present invention preferably comprises from about 20% to about 40%, more preferably from about 20% to about 35%, still more preferably from about 20% to about 30% by weight corn flakes, and preferably from about 5% to about 25%, more preferably from about 5% to about 20%, still more preferably from about 5% to about 15% by weight crisp rice.

The low fiber, high degree of cook, fraction can further comprise rapid energy releasing, non-grain foods which are compatible with the grain fractions described herein. Any rapid energy releasing, non-grain food sources known to those skilled in the art may be used in the present invention. Examples of such rapid energy releasing, non-grain food sources include, but are not limited to, simple carbohydrate sources such as sugar, brown sugar, honey, glucose syrups, maltose, fructose, polyols, dried fruit, and mixtures thereof, with honey, brown sugar, glucose syrups, and mixtures thereof being preferred, and honey and brown sugar being more preferred.

When such rapid energy releasing, non-grain food sources are included in the low fiber, high degree of cook, fraction, the solid food composition comprises from about 5% to about 30%, preferably from about 10% to about 30%, more preferably from about 10% to about 20% by weight brown sugar; from about 0.5% to about 5%, preferably from about 1% to about 4%, more preferably from about 1% to about 3% by weight honey; from about 2% to about 20%, preferably from about 2% to about 15%, more preferably from about 2% to about 10% by weight glucose syrup.

By low fiber, high degree of cook, as applied to grains, it is meant that the fraction is generally low in fiber, and has been processed to a high degree of cook. When referring to low in fiber, the fraction being referred to is low in both soluble and insoluble fiber. The total fiber level for the low fiber, high degree of cook, fraction is typically in the range of from about 0.5% to about 3%, more typically from about 1% to about 2.5%, still more typically in the range of from about 1.5% to about 2.5% by weight, expressed as a percentage of the low fiber, high degree of cook, fraction. The vast majority of the total fiber comprises insoluble fiber. Typically the total fiber comprises from about 0.5% to about 3%, more typically from about 1% to about 2.5%, still more typically from about 1.5% to about 2.5% by weight insoluble fiber. By high degree of cook, it is meant that the grain fraction is substantially completely gelatinized, or cooked, such that it can be digested readily, thereby providing a quick energy release to the consumer. Typically, the grain source is gelatinized to within the range of from about 70% to 100%, preferably from about 70% to about 90%, more preferably from about 75% to about 85%, expressed as a percentage of 100% gelatinization of the starch molecules contained in the grain source. In the present invention the terms "cooked" and "gelatinized" are used synonymously. By either "cooked" or "gelatinized", it is meant that the grains are heated in the presence of sufficient water, for a sufficient period of time to transform native starch into cooked/gelatinized starch. Preferably, the ratio of water to grains in the cooking/gelatinizing step is in the ratio of from about 0.25:1 to about 1:1, more preferably from about 0.25:1 to about 0.5:1, still more preferably from about 0.25:1 to about 0.33:1. Preferably the grains are heated in the presence of water for a period of time in the range of from about 0.01 to about 0.2, more preferably from about 0.01 to about 0.1, still more preferably from about 0.01 to about 0.05 hours.

The cooking, or gelatinization, can be accomplished by any means known to those skilled in the art, and in the case of flake carbohydrate sources, i.e., corn flakes, is typically obtained by processing grain, i.e., corn, through an extrusion device such as a single or twin screw extruder, under time and temperature conditions sufficient to produce a cooked dough. This cooked dough is further processed and flaked.

One reference which teaches a method for preparing a cooked, flake carbohydrate source is the article "Twin Screw Extrusion of Corn Flakes", T. Midden, *Cereal Foods World*, Vol. 34, No. 11, pp. 941–943 (1989), the disclosure of which is incorporated herein by reference. This article teaches a method for extruding a cooked cereal dough and preparing a flake product from the cooked cereal dough. Specifically, this article teaches a method for producing corn flakes wherein the flake ingredients are batch mixed and fed into an extruder. In the extruder, the ingredients are cooked, cooled and processed into spaghetti-like strands. After cooling, these strands are cut into pellets, which are sent forward for flaking and toasting according to traditional methods.

The medium fiber, medium degree of cook, fraction is characterized in that it is digested at a rate slower than the low fiber, high degree of cook, fraction, and at a rate faster than the high fiber, low degree of cook, fraction. The medium fiber, medium of cook, fraction correspondingly releases energy at a rate slower than the low fiber, high degree of cook, fraction, and at a rate faster than the high fiber, low degree of cook, fraction. The medium fiber, medium degree of cook, fraction is typically digested, and releases its energy, over a period of time of from about 0.5 to about 4, more typically from about 0.5 to about 3, still more typically from about 1 to about 3 hours.

The medium fiber, medium degree of cook, fraction may comprise any grain source known to those skilled in the art which is in a condition to satisfy the above-described characteristics. The medium fiber, medium degree of cook, fraction may further comprise medium energy releasing, non-grain sources of food which are digested at a rate lower than the low fiber, high degree of cook, fraction, and at a rate faster than the high fiber, low degree of cook, fraction, and correspondingly release energy at a rate slower than the low fiber, high degree of cook, fraction, and at a rate faster than the high fiber, low degree of cook, fraction.

As already stated herein, to increase the rate of digestion of grains, and correspondingly increase the rate of energy release of grains, the grains typically have to be gelatinized, or cooked, to a degree. Examples of grain fractions useful in the medium fiber, medium degree of cook, fraction include, but are not limited to, whole grain rye, whole grain wheat, which is processed via a cooking extruder and flaking rolls, and mixtures thereof, with whole grain wheat processed via a cooking extruder and flaking rolls being preferred.

When the medium fiber, medium degree of cook, fraction is comprised of the preferred whole grain wheat, the solid food composition of the present invention preferably comprises from about 20% to about 40%, more preferably from about 20% to about 35%, still more preferably from about 20% to about 30% by weight of the wheat processed via cooking extruder and flaking rolls.

By medium fiber, medium degree of cook, as applied to grains, it is meant that the grain source generally has a medium fiber content, as compared to the low fiber and high fiber fractions, and has been processed to a medium degree of cook, as compared to the low degree of cook and high degree of cook fractions. More specifically, when referring to medium fiber, what is being referred to is a fraction comprising from about 3% to about 7%, preferably from about 4% to about 6%, still more preferably from about 4.5% to about 5.5% by weight insoluble fiber, expressed as a percentage of the medium fiber, medium degree of cook fraction. By medium degree of cook, it is meant that the grain source of this fraction is partially cooked, or gelatinized. Typically, the grain source is gelatinized to within the range of from about 40% to about 80%, preferably from about 45% to about 75%, more preferably from about 50% to about 70%, expressed as a percentage of 100% gelatinization of the starch molecules contained in the grain source.

The gelatinization of the medium fiber, medium degree of cook, fraction can be accomplished by any of the processes described herein. Typically, the grains are heated in the presence of sufficient water, for a sufficient period of time to achieve the above-described degrees of gelatinization. Preferably, the ratio of water to grains in the cooking/gelatinizing step is in the ratio of from about 0.25:1 to about 1:1, more preferably from about 0.25:1 to about 0.5:1, still more preferably from about 0.25:1 to about 0.33:1. Preferably the grains are heated in the presence of water for a period of time in the range of from about 0.01 to about 0.2, more preferably from about 0.01 to about 0.1, still more preferably from about 0.01 to about 0.05 hours. Alternatively, the grains can be gelatinized by the process of batch cooking described in "Breakfast Cereals and How They Are Made", by R. Fast and E. Caldwell, Editors, First Edition, Published by the American Association of Cereal Chemists, pp. 53–56 (1990), the disclosure of which is incorporated herein by reference.

Non-limiting examples of medium energy releasing, non-grain food sources which can be included in the medium fiber, medium degree of cook, fraction are legumes. When such medium energy releasing, non-grain food sources are included in the medium fiber, medium degree of cook, fraction of the present invention, the solid food composition comprises from about 2% to about 20%, preferably from about 2% to about 15%, more preferably from about 2% to about 10% by weight legumes.

The high fiber, low degree of cook, fraction is characterized in that it is digested at a rate slower than both the low fiber, high degree of cook, fraction, and the medium fiber, medium degree of cook, fraction. The high fiber, low degree of cook, fraction correspondingly releases energy at a rate slower than both the low fiber, high degree of cook, fraction, and the medium fiber, medium degree of cook, fraction. The high fiber, low degree of cook, fraction is typically digested, and releases its energy, over a period of time of from about 2 to about 6, more typically from about 2 to about 5, still more typically from about 1 to about 4 hours.

The high fiber, low degree of cook, fraction, may comprise any grain source known to those skilled in the art which is in a condition to satisfy the above-described characteristics. The high fiber, low degree of cook, fraction may further comprise low energy releasing, non-grain sources of food which are digested at a rate lower than both the low fiber, high degree of cook, fraction, and the medium fiber, medium degree of cook, fraction, and correspondingly release energy at a rate slower than both the low fiber, high degree of cook, fraction, and the medium fiber, medium degree of cook, fraction.

Examples of grain sources useful for the high fiber, low degree of cook, fraction include, but are not limited to, barley, rolled oats, oat flour, and mixtures thereof.

When barley is the source of the high fiber, low degree of cook grain fraction, the solid food composition of the present invention comprises from about 5% to about 25%, preferably from about 5% to about 20%, still more preferably from about 5% to about 15% by weight of barley; when rolled oats are used as the high fiber, low degree of cook grain fraction, the solid food composition of the present invention comprises from about 20% to about 40%, preferably from about 20% to about 35%, still more preferably from about 20% to about 30% by weight rolled oats; when oat flour is used as the source of high fiber, low degree of cook, fraction, the solid food composition of the present invention comprises from about 20% to about 40%, preferably from about 20% to about 35%, still more preferably from about 20% to about 30% by weight of oat flour.

By high fiber, and low degree of cook, as applied to grains, it is meant that the fraction generally has a high fiber content, as compared to the low fiber and medium fiber fractions, and has been processed to a low degree of cook. When referring to high fiber, what is being referred to is a fraction comprising from about 7% to about 10%, preferably from about 8% to about 9.5%, still more preferably from about 8.5% to about 9% by weight of a combination of soluble and insoluble fiber, with a minimum of about 3.5% by weight soluble fiber, expressed as a percentage of the high fiber, low degree of cook fraction. By low degree of cook, it is meant that the grain source of this fraction is not cooked to a substantial degree, or not gelatinized to a substantial degree. For grain sources, they are typically gelatinized to within a range of from about 20% to about 60%, preferably from about 30% to about 60%, more preferably from about 30% to about 55%, expressed as a percentage of 100% gelatinization of the starch molecules contained in the grain source.

As with the other fractions, the high fiber, low degree of cook, fraction may be gelatinized by any method known to those skilled in the art. Of course, any processing will be minimal. A preferred process for gelatinizing the grains can be found at pages 245-259 of the book entitled "Breakfast Cereals etc.", published by The American Association of Cereal Chemists, First Edition, (1990), the disclosure of which is incorporated herein by reference.

When the high fiber, low degree of cook, fraction is combined with the low fiber, high degree of cook, fraction, and medium fiber, medium degree of cook, fraction, in the solid food composition of the present invention, the composition provides for a prolonged energy release to the consumer. After the food is consumed, the low fiber, high degree of cook, fraction provides an initial energy release. This is because it is digested most quickly. After a period of time, typically after about 2, more typically after about 1.5, still more typically after about 1 hours, the energy being released by the low fiber, high degree cook, fraction starts to diminish, and the medium fiber, medium degree of cook, fraction starts to release energy through digestion. Because the medium fiber, medium degree of cook, fraction is not digested as rapidly as the low fiber, high degree of cook fraction, its energy release is sustained over time so that once the energy release from the low fiber, high degree of cook, fraction starts to taper off, typically after about 2, more typically after about 2.5, still more typically after about 3 hours, the energy from the medium fiber, medium degree of cook, fraction is continued to be released. When the energy release from the medium fiber, medium degree of cook, fraction begins to taper off, typically after about 2, more typically after about 2.5, still more typically after about 3.5 hours, the energy release from the high fiber, low degree of cook, fraction begins to take affect. This is because the high fiber, low degree of cook, fraction is relatively uncooked, and it takes the body a longer time to digest it, and the soluble fiber content slows down the digestion process. Thus, the solid food composition provides for a sustained energy release when consumed. While not intending to be bound by theory, it is surprising that the particular ingredient combination used in the present invention provides such a sustained energy release product.

In addition to the fraction described above, other ingredients typically used in solid food compositions, and the preferred ready-to-eat cereal compositions, may be incorporated into the solid food and cereal compositions of the present invention. Examples of such constituents include, but are not limited to, flavoring agents, salt, malt, vitamins, antioxidants, and mixtures thereof, with flavoring agents and salt being preferred.

When flavoring agents are used in the present invention, the solid food composition typically comprises from about 0.01% to about 0.20%, preferably from about 0.02% to about 0.15%, more preferably from about 0.05% to about 0.10% flavoring agents. When sodium is used the in the present invention, the solid food composition typically comprises from about 0.1% to about 0.5%, preferably from about 0.1% to about 0.4%, more preferably from about 0.1% to about 0.3% of sodium.

The present invention is further illustrated, but not limited by, the following examples.

EXAMPLES

Example 1

A ready-to-eat cereal product having the following formula is prepared.

| Ingredient | Wt. % |
|---|---|
| Rolled Oats | 20.0 |
| Oat Flour | 2.5 |
| Maize | 21.4 |
| Wheat | 21.4 |
| Brown Sugar | 15.5 |
| Crisp Rice | 7.7 |
| Maltodextrin | 3.8 |
| Vegetable Oil | 1.5 |
| Malt Extract | 1.5 |
| Glucose Syrup | 1.5 |
| Honey | 1.3 |
| Hazelnut | 1.0 |
| Sodium Chloride | 0.7 |
| Vitamins | 0.1 |
| Preservative | 0.1 |
| TOTAL | 100.0 |

The low fiber, high degree of cook, fraction is prepared as follows. Corn flakes are manufactured according to the manufacturing method described in the article "Twin Screw Extrusion of Corn Flakes", T. Midden, *Cereal Foods World*, Vol. 34, No. 11, pp. 941–943 (1989), the disclosure of which is incorporated herein by reference. The degree of gelatinization of the corn flakes is 80%, expressed as a percentage of 100% gelatinization of the starch in the corn flakes. Sixty grams of the extruded corn flakes are coated with a blend of 13.6 grams brown sugar, 1.4 grams honey, 6.9 grams maltodextrin and 0.1 grams vitamins to form a coated corn flake. The coated corn flakes are then sprinkled with 18 grams rolled oats to form coated and sprinkled corn flakes. The coated and sprinkled corn flakes are then dried in a band dryer and toasted in a band toaster.

The medium fiber, medium degree of cook, fraction is prepared as follows. Whole grain wheat flakes are manufactured according to the manufacturing method described in the article "Twin Screw Extrusion of Corn Flakes", T. Midden, *Cereal Foods World*, Vol. 34, No. 11, pp. 941–943 (1989), the disclosure of which is incorporated herein by reference. The degree of gelatinization of the wheat flakes is 60%, expressed as a percentage of 100% gelatinization of the starch in the wheat flakes. Sixty grams of the extruded whole grain wheat flakes are coated with a blend of 13.6 grams brown sugar, 1.4 grams honey, 6.9 grams maltodextrin and 0.1 grams vitamins to form a coated whole grain wheat flake. The coated whole grain wheat flakes are then sprinkled with 18 grams rolled oats to form coated and sprinkled whole grain wheat flakes. The coated and sprinkled whole grain wheat flakes are then dried in a band dryer and toasted in a band toaster.

The high fiber, low degree of cook, fraction is prepared as follows. Twenty-four grams of rolled oats, 10 grams of oat flour, 30.8 grams of crisp rice, and a syrup consisting of 17.2 grams brown sugar, 2.0 grams honey, 6.0 grams glucose syrup, 3.6 grams hazelnut, 6.0 grams vegetable oil, 0.2 grams flavoring, and 0.2 grams preservatives, are blended together. The resulting blend is then dried in a band dryer and toasted in a band toaster. After drying and toasting, the blend is classified into bite size shapes. The crisp rice is prepared in the manner set forth in U.S. Pat. No. 4,623,546, the disclosure of which is incorporated herein by reference.

Thirty-seven and one-half grams of the high fiber, low degree of cook, fraction, 37.5 grams of the medium fiber, medium degree of cook, fraction, and 25 grams of the low fiber, high degree of cook, fraction are combined together to form the ready-to-eat cereal product.

Example 2

A ready-to-eat cereal product having the following formula is prepared.

| Ingredient | Wt. % |
|---|---|
| Oats | 31.0 |
| Wheat | 30.5 |
| Brown Sugar | 10.9 |
| Raisins | 10.0 |
| Almonds | 7.0 |
| Vegetable Oil | 4.1 |
| Barley | 3.7 |
| Honey | 2.8 |
| TOTAL | 100.0 |

Eighty-four and one-half grams of whole grain wheat is batch cooked. The whole grain wheat is cooked according to the batch cooking method described in "Breakfast Cereals and How They Are Made", R. Fast and E. Caldwell, Eds., First Edition, Published by the American Association of Cereal Chemists, pp. 53–56 (1990), the disclosure of which is incorporated herein by reference. The degree of gelatinization of the whole grain wheat is 60%, expressed as a percentage of 100% gelatinization of the starch in the wheat. The batch cooked whole grain wheat is then flaked in a roller flaking machine and dried in a band dryer. The dried whole grain wheat flakes are then coated with a blend of 14 grams brown sugar and 1.5 grams honey to form coated whole grain wheat flakes. The coated whole grain wheat flakes are then dried in a band dryer and toasted in a band toaster to form toasted, coated whole grain wheat flakes.

Seventy-four grams of whole grain rolled oats are coated with a blend of 12.7 grams brown sugar, 4.7 grams honey, and 8.6 grams vegetable oil to form coated whole grain rolled oats. The coated whole grain rolled oats are then dried in a band dryer to form dried, coated whole grain rolled oats. The whole grain rolled oats are dried, not cooked, and the cereal is not further gelatinized in the drying process. The degree of gelatinization of the whole grain oats is 45%, expressed as a percentage of 100% gelatinization of the starch in the oats.

Seventy-four grams of rolled barley is coated with a blend of 12.7 grams brown sugar, 4.7 grams honey, and 8.6 grams vegetable oil to form coated rolled barley. The coated rolled barley is then dried in a band dryer to form dried, coated rolled barley. The rolled barley is dried, not cooked, and the cereal is not further gelatinized in the drying process. The degree of gelatinization of the rolled barley is 45%, expressed as a percentage of 100% gelatinization of the starch in the barley.

Forty-two grams of dried, coated whole grain rolled oats, 5 grams of dried, coated rolled barely, 36 grams of toasted, coated whole grain wheat flakes, 10 grams dried fruit, and 7 grams nuts are combined together to form the ready-to-eat cereal product. The fraction with the fastest energy release is derived from the brown sugar, honey and dried fruits. The fraction with the slowest energy release is derived from the toasted, coated whole grain rolled oats and rolled barley. The fraction with the medium energy release is derived from the toasted, coated whole grain wheat flakes and the nuts.

What is claimed is:

1. A solid food composition which is digested over an extended period of time and which provides for the release of energy over an extended period of time, said solid food composition comprising: (a) from about 20% to about 55% by weight of a low fiber, high degree of cook, fraction, wherein the low fiber, high degree of cook fraction comprises from about 0.5% to about 3% by weight total fiber and is gelatinized to within the range of from about 70% to 100%, (b) from about 20% to about 40% by weight of a medium fiber, medium degree of cook, fraction, wherein said medium fiber, medium degree of cook fraction comprises from about 3% to about 7% by weight insoluble fiber and is gelatinized to within the range of from about 40% to 80%, and (c) from about 20% to about 45% by weight of a high fiber, low degree of cook, fraction, wherein said high fiber, low degree of cook fraction comprises from about 7% to about 10% by weight of a combination of soluble and insoluble fiber, with a minimum of about 3.5% by weight soluble fiber and is gelatinized to within the range of from about 20% to 60%, wherein said solid food composition comprises at least about 20% by weight of an oat source selected from the group consisting of rolled oats or oat flour, and wherein said oat source is provided by the high fiber, low degree of cook fraction.

2. A solid food composition according to claim 1 wherein the solid food composition is a ready-to-eat cereal composition comprising from about 20% to about 50% by weight of said low fiber, high degree of cook, fraction, from about 20% to about 35% by weight of said medium fiber, medium degree of cook, fraction, and from about 20% to about 40% by weight of said high fiber, low degree of cook, fraction, and wherein the ready-to-eat cereal composition is digested and releases its energy over a period of time ranging from about 0.5 to about 6 hours.

3. A ready-to-eat cereal composition according to claim 2 which comprises from about 20% to about 40% by weight of rolled oats.

4. A ready-to-eat cereal composition according to claim 2 wherein said low fiber, high degree of cook, fraction comprises grains selected from the group consisting of corn flakes, crisp rice, puffed rice, flaked rice, and mixtures thereof.

5. A ready-to-eat cereal composition according to claim 4 which comprises from about 25% to about 45% by weight low fiber, high degree of cook, fraction, wherein said low fiber, high degree of cook, fraction comprises grains selected from the group consisting of corn flakes, crisp rice, and mixtures thereof, and wherein said low fiber, high degree of cook, fraction is digested and releases its energy over a period of time ranging from about 0.5 to about 2.5 hours.

6. A ready-to-eat cereal composition according to claim 4 wherein said medium fiber, medium degree of cook, fraction comprises grains selected from the group consisting of whole grain rye, whole grain wheat, which is processed via a cooking extruder and flaking rolls, and mixtures thereof.

7. A ready-to-eat cereal composition according to claim 6 which comprises from about 20% to about 30% by weight medium fiber, medium degree of cook, fraction, and wherein said medium fiber, medium degree of cook, fraction is digested and releases its energy over a period of time ranging from about 0.5 to about 4 hours.

8. A ready-to-eat cereal composition according to claim 6 wherein said high fiber, low degree of cook, fraction comprises grains selected from the group consisting of barley, rolled oats, oat flour, and mixtures thereof.

9. A ready-to-eat cereal composition according to claim 7 which comprises from about 20% to about 35% by weight high fiber, low degree of cook, fraction, wherein said low fiber, high degree of cook, fraction is digested and releases its energy over a period of time ranging from about 2 to about 6 hours.

10. A ready-to-eat cereal composition according to claim 9 wherein the high fiber, low degree of cook, fraction is rolled oats.

* * * * *